United States Patent [19]
Taniguchi

[11] Patent Number: 4,737,819
[45] Date of Patent: Apr. 12, 1988

[54] LIGHT EXPOSURE LAMP HAVING ABNORMAL CONDITION MONITOR
[75] Inventor: Akihiko Taniguchi, Nara, Japan
[73] Assignee: Sharp Kabushiki Kaisha, Osaka, Japan
[21] Appl. No.: 833,196
[22] Filed: Feb. 27, 1986
[30] Foreign Application Priority Data
  Mar. 1, 1985 [JP] Japan .................. 60-41578
[51] Int. Cl.⁴ .......................... G03G 15/04
[52] U.S. Cl. ...................... 355/14 E; 355/68
[58] Field of Search ............. 355/14 E, 14 D, 14 R, 355/67–69; 250/559; 358/385

[56] References Cited
U.S. PATENT DOCUMENTS 2,956,487 10/1960 Giaimo, Jr. .................. 355/14 D
3,995,959 12/1976 Shaber ......................... 250/559 X
4,124,294 11/1978 Nakamura ....................... 355/68
4,215,930 8/1980 Miyakawa et al. ........... 355/14 E X
4,239,374 12/1980 Tatsumi et al. .............. 355/14 D X
4,640,603 2/1987 Honma ...................... 355/14 E X FOREIGN PATENT DOCUMENTS
59-15263 1/1984 Japan ........................ 355/14 E Primary Examiner—A. T. Grimley
Assistant Examiner—J. Pendegrass
Attorney, Agent, or Firm—Birch, Stewart, Kolasch & Birch

[57] ABSTRACT

An abnormal condition detection device for an automatically controlled light scanning device includes a light exposure lamp for emitting light toward an original mounted on an original table, a reflection plate for reflecting light from at least a portion of the original table, a sensor for receiving light reflected from the reflection plate, a plurality of comparators for detecting the amount of light received by the sensor, and a detection circuit for determining whether or not the amount of light detected by the comparators is within a predetermined normal range.

6 Claims, 3 Drawing Sheets

LIGHT EXPOSURE LAMP HAVING ABNORMAL CONDITION MONITOR

BACKGROUND OF THE INVENTION

The present invention relates to a light exposure lamp control circuit and, more particularly, to an abnormal condition monitor for monitoring the condition of a light exposure lamp by monitoring the detection of a light amount sensor for detecting the light amount of a light scanning lamp in a light scanning device for an electrophotographic copying machine, an image scanner, or a facsimile machine.

Tradionally, electrophotographic copying machines are equipped with automatic light exposure-amount control devices for automatically controlling the amount of light exposure for scanning the face of an original, in accordance with the brightness of the face of the original. As the black portions of the original images increase, the overall darkness of the original also increases. With such an automatic light-exposure-amount control device, regardless of the darkness of the original, a constant of copied paper can be enabled. However, a correct light exposure may not be achieved in the case where the light scanning lamp has deteriorated, or the light control means becomes absormal.

SUMMARY OF THE INVENTION

Accordingly, it is an object of the present invention to provide an improved light exposure lamp abnormal condition detection means for a light scanning device for monitoring the condition of a light exposure lamp using the output of a photosensor in an automatic light exposure control device.

It is another object of the present invention to provide an improved light exposure lamp monitor means for a light scanning device for continuously detecting the condition of a light exposure lamp by monitoring the detection output signal of a light amount sensor detecting the light amount of the light exposure lamp.

Briefly described, in accordance with the present invention, a light exposure condition detection means for a light scanning device such as an electrophotographic copying machine, an image scanner, or a facsimile machine comprises automatic light controller, a light sensor and detection device for monitoring the light amount reflected from the original, and a level determination device for determining the level of light received by the sensor, so as to detect whether or not the light exposure lamp is operating in an abnormal condition.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
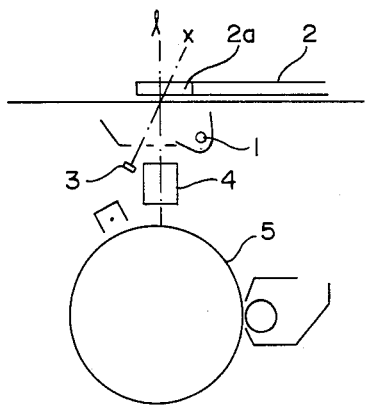
FIG. 1 is a side sectional view of an electrophotographic copying machine of an automatic light-exposure control type having a light-abnormal condition monitor device according to the present invention.

FIG. 1 is a side view of an electrophotographic copying machine having a light-abnormal condition monitor device in the present invention. In the following description, an original table carrying an original in the copying machine can reciprocate so that the original mounted on the original table can be light scanned. It is to be noted that the original table may also be of the type which does not reciprocate while carrying the original. Further, the application of the present invention should not be limited to a copying machine although the following description is in terms of the copying machine. It may be possible that an image scanner or a facsimile machine is equipped with the light condition monitor of the present invention. In any case, according to the present invention, an abnormal condition of the light exposure lamp can be monitored.

Referring to FIG. 1, a light exposure lamp 1 is provided within the inner side of the copying machine and under an original table 2 carrying an original to be copied. The light from the lamp 1 is incident upon the lower face of the original by means of a reflection plate. A convergence lens 4 is provided for converging the reflected light from the original onto a photoreceptor 5. The original is positioned at the focal point of the light from the lamp 1. The lens 4 is positioned just below the focal point of the light from the lamp 1. A photodiode 3 is positioned adjacent the convergence lens 4 in such a manner that an optical axis x of the photodiode 3 is inclined somewhat clockwise from an optical axis 1 of the convergence lens 4. With such an arrangement, the photodiode 3 can receive the illumination from a portion of the original just before that portion of the original is illuminated by the light from the lamp 1 and the reflection light is converged by the convergence lens 4.

Figure 2:
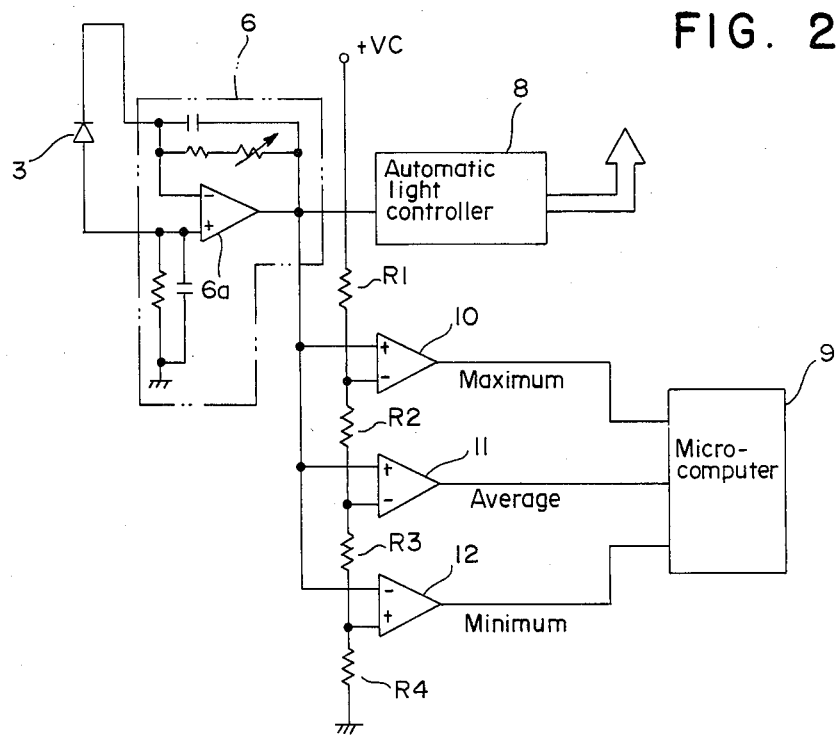
FIG. 2 is a block diagram of the light-abnormal condition monitor device of the present invention.

FIG. 2 is a block diagram of the light-abnormal condition monitoring device of the present invention.

The photodiode 3 is connected to a preamplifier 6 comprising an amplifier 6a so that the output of the photosensor 3 is amplified. The amplified output from the preamplifier 6a is input into an automatic light amount controller 8 and three comparators 10, 11, and 12. The automatic light amount controller 8 is provided for controlling the light intensity of the lamp 1 in response to the detection input, so that the photoreceptor 5 receives a constant amount of light exposure. The comparators 10 to 12 each comprise an operational amplifier. The output of the photosensor 3 is input into a positive terminal of the comparators 10 and 11 and input into a negative terminal of the comparator 12. A reference voltage is input into a negative terminal of the comparators 10 and 11 and input into a positive terminal of the comparator 12. The reference voltage is obtained by dividing a DC voltage +Vc with resistances R1, R2, and R3. Each of the reference voltages is selected so that when the photodiode 3 detects respective particular amounts from light of the lamp 1, those reference voltages are equal to the respective detection levels to be input into the respective comparators 10, 11, and 12.

More particularly, the reference voltage input into the comparator 10 is set so that it is equal to the detection voltage of the photosensor 3 when the lamp 1 illuminates at its maximum power. The reference voltage input into the comparator 11 is set so that it is equal to the detection voltage of the photosensor 3 when the lamp 1 illuminates an average emission light in its normal condition. The reference voltage input into the comparator 12 is set so that it is equal to the detection voltage of the photosensor 3 when the lamp 1 illuminates at a minimum power.

With such selection, the comparators 10 and 11 output a high level signal "H" when the light of the lamp 1 exceeds its maxium power. The comparator 12 outputs a high level signal "H" when the light of the lamp 1 is below the minimum power output. When the light of the lamp 1 is between the maximum and the average power, only the comparator 11 outputs a high level signal "H". When the light is between the minimum and the average, all the comparators 10 to 12 output a low level signal "L". These outputs are entered into a microcomputer 9 for determining whether or not the level of light detected is within a predetermined range.

Figure 3A:
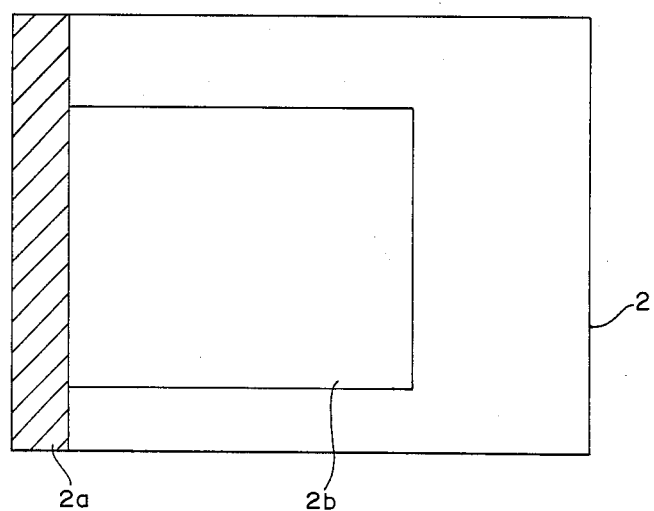
FIG. 3(A) is a plan view of an original table in the copying machine of FIG. 1.

FIG. 3(A) is a plan view of the original table 2.

Within the original table 2, a white portion 2a is formed at the edge of the original table 2. The white portion 2a is initially light scanned by the lamp 1 prior to the light scanning on the original, so that a standard light amount to be emitted from the lamp 1 can be defined. The white portion 2a is therefore provided. Other than the white portion 2a, a transparent glass plate is formed on the original table 2 on which the original is actually mounted for copying purposes.

Figure 3B:
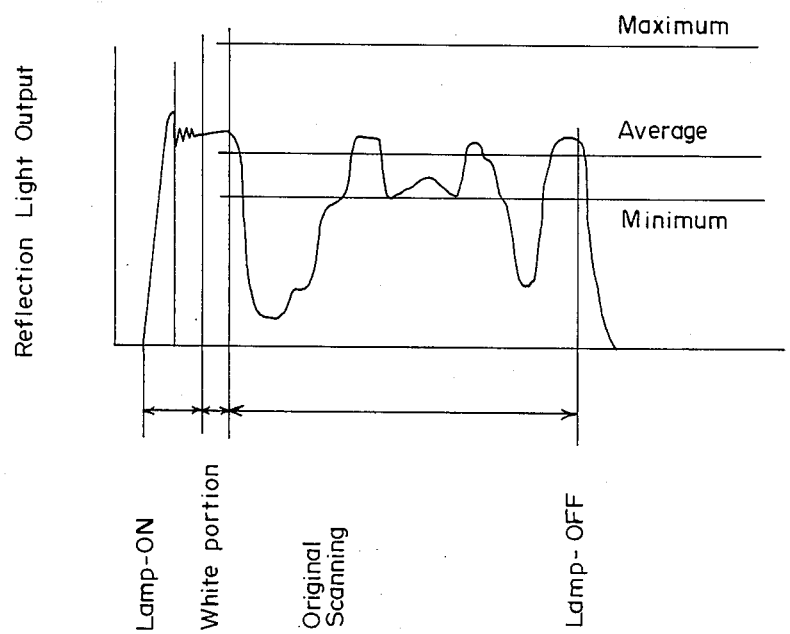
FIG. 3(B) is a graph representative of changes in the detection output in the light-abnormal condition monitor device of FIG. 2.

FIG. 3(B) is a graph representative of changes in the detection signals while the original table 2 is light scanned.

The lamp 1 illuminates the white portion 2a at the start of light scanning so that the photodiode 3 can detect the reflection light amount from the white portion 2a. At this time, the automatic light amount controller 8 is operated so that the detection voltage from the photosensor 3 at the initial stage for the white portion 2a is fixed at a particular constant voltage by automatically controlling the light exposure from the lamp 1. Therefore, when the lamp starts to light scan the net region from the original, the light amount from the lamp 1 is dept constant so that a correct copy is made of the white portion free of image and the black portion having some image.

Here, when the automatic light amount controller 8 is damaged or otherwise the lamp 1 cannot illuminate at a normal power because of the deterioration of itself, the light exposure amount of the white portion 2a will either exceed the maximum or otherwise be below the minimum amount of necessary light exposure. In such a case, on behalf of the present invention, the comparators 10, 11, and 12 output an abnormal signal of the high level signal "H" to the microcomputer 9. Those comparators correspond to the light amount detection device of the present invention.

Figure 4:
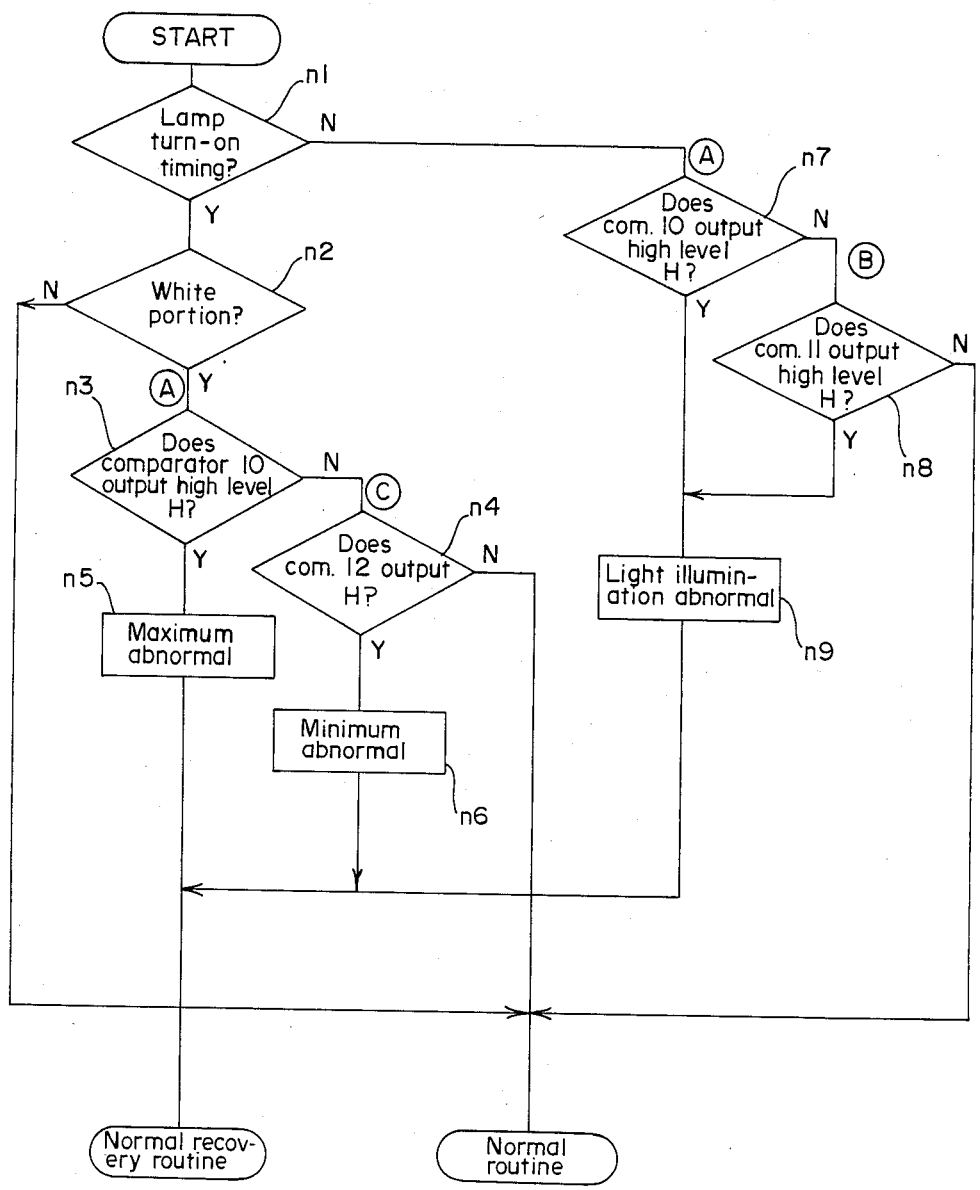
FIG. 4 is a flow chart of monitoring light intensity from a light exposure lamp by the light-abnormal condition monitor device of the present invention.

FIG. 4 is a flow chart for monitoring the condition of the lamp 1 by the microcomputer 9. The following steps are selected:

Step n1: It is detected whether the copying operation at this stage is a timing of illuminating the lamp 1. If so, step n2 is selected.

Step n2: It is detected whether the detection output from the photodiode 3 at this stage is derived by light scanning the white portion 2a of the original table 2.

Steps n3 and n4: When the photodiode output is derived from the reflection light from the white portion 2a, it is determined whether the output is between the maximum and the minimum.

Step n5: Step n5 is selected so as to set the high-level-abnormal condition, if in step n3 the detection output exceeds the maximum. An abnormal condition recovery routine is further selected.

Step n6: Step n6 is selected so as to set a low-level-abnormal condition, if in step n4 the light amount is below the minimum. The abnormal condition recovery routine is further selected also.

If both the maximum and the minimum are normal, the next copying operation is run.

Steps n7 and n8: These steps are selected when it is detected that it is not a correct light illumination timing of the lamp 1 in step n1. In these steps, it is determined whether the reflected light from the original table 2 exceeds the maximum or the average level of the lamp 1. The operation of these steps can enable detection of the abnormal condition of the control means by determining that the lamp 1 illuminates at other than a correct illumination timing period. Accurate detection of the abnormal condition is expected since the detection is done regarding both the maximum and the average.

Step n9: Step n9 is selected to set an abnormal condition of the lamp 1 if the high level signal "H" is generated from either of the comparators 10 and 11 at steps n7 and n8. The abnormal condition recovery routine is further selected. When the low level signal "L" is generated from both of the comparators 10 and 11, it can be determined that the lamp 1 is not illuminating abnormally, whereby the next normal copying operation is returned.

Steps n3, n4, n7, and n8 are enabled as level detection steps of the present invention.

It may be preferred that the abnormal condition of the lamp 1 is checked in a preliminary light scanning period by operating the light amount detection device and the level detection steps of the present invention in a preliminary period. In the preliminary light scanning period, no actual image reflection from the original is focused on the photoreceptor although the light scans the orignal.

According to the present invention, the light amount monitor circuit is additionally provided for continuously monitoring the detection output of the photosensor, so that the normal and abnormal conditions of the detection level can be determined. The over-illumination of the light exposure lamp 1, the under-illumination of the light exposure lamp 1, and the light illumination at the incorrect illumination timing can be all detected so as to select the abnormal condition recovery operations. By using the photodiode for the automatic light control device, only the light amount detection circuit and the level detection device are additionally needed.

While only certain embodiments of the present invention have been described, it will be apparent to those skilled in the art that various changes and modifications may be made therein without departing from the spirit and scope of the present invention as claimed.

What is claimed is:

1. An abnormal condition detection device for an automatically controlled light scanning device, said detection device comprising:

a light exposure lamp for emitting light toward an original mounted on an original table;

means for reflecting light from at least a portion of said original table;

sensor means for receiving light reflected from said at least a portion of said original table;

means for detecting an amount of light received by said sensor means, said means for detecting including a plurality of comparator means for providing a signal representative of a level of light received by said sensor means, said plurality of comparators having reference voltages applied thereto corresponding to maximum, average, and minimum values of light;

means, responsive to said means for detecting, for determining whether or not the level of light detected is within a predetermined normal range; and means for initiating an abnormal recovery routine or a normal routine in said automatically controlled light scanning device in response to said means for determining.

2. The detection device according to claim 1, wherein said means for detecting an amount of light received by said sensor means is further for determining whether or not said light exposure lamp is illuminated during a predetermined exposure time period.

3. The detection device according to claim 1, wherein said means for detecting is operative during a predetermined time period required for a copying cycle.

4. The detection device according to claim 3, wherein said predetermined time period includes a preliminary period of light scanning for scanning said at least a portion of said original table.

5. The detection device according to claim 1, wherein said abnormal recovery routine is selected if the level of light detected by said means for detecting is outside of said predetermined normal range.

6. The detection device according to claim 1, wherein said normal routine is selected if the level of light detected is within said predetermined normal range.

* * * * *